(12) United States Patent
Koslowski

(10) Patent No.: US 8,091,304 B2
(45) Date of Patent: Jan. 10, 2012

(54) CONSTRUCTION BOARD

(75) Inventor: Thomas Koslowski, Dortmund (DE)

(73) Assignee: Knauf Perlite GmbH (DE)

( * ) Notice: Subject to any disclaimer, the term of this patent is extended or adjusted under 35 U.S.C. 154(b) by 10 days.

(21) Appl. No.: 12/223,292

(22) PCT Filed: Oct. 31, 2006

(86) PCT No.: PCT/EP2006/010459
§ 371 (c)(1),
(2), (4) Date: Jul. 28, 2008

(87) PCT Pub. No.: WO2007/090445
PCT Pub. Date: Aug. 16, 2007

(65) Prior Publication Data
US 2009/0038248 A1    Feb. 12, 2009

(30) Foreign Application Priority Data
Feb. 9, 2006  (DE) .......................... 10 2006 005 899

(51) Int. Cl.
*E04C 1/00* (2006.01)
*E04B 9/00* (2006.01)
*C04B 7/00* (2006.01)

(52) U.S. Cl. .......................... 52/309.1; 106/713; 52/344

(58) Field of Classification Search ................. 52/309.1, 52/309.3, 320, 344
See application file for complete search history.

(56) References Cited

U.S. PATENT DOCUMENTS

| | | | | |
|---|---|---|---|---|
| 2,857,287 A * | 10/1958 | Kampf | .......................... | 106/665 |
| 3,284,980 A | 11/1966 | Dinkel | .......................... | 52/600 |
| 3,886,076 A * | 5/1975 | Venable | .......................... | 252/62 |
| 3,992,340 A * | 11/1976 | Bonitz | .......................... | 524/59 |
| 4,473,404 A | 9/1984 | Eckardt et al. | .......................... | 106/84 |
| 5,112,405 A * | 5/1992 | Sanchez | .......................... | 106/608 |
| 5,114,617 A * | 5/1992 | Smetana et al. | .......................... | 252/378 P |
| 7,047,701 B2 | 5/2006 | Bonetto et al. | .......................... | 52/415 |
| 2002/0090871 A1* | 7/2002 | Ritchie et al. | .......................... | 442/42 |
| 2006/0150868 A1* | 7/2006 | Spickemann et al. | .......................... | 106/783 |
| 2007/0232736 A1 | 10/2007 | Liling | .......................... | 524/425 |
| 2009/0011207 A1* | 1/2009 | Dubey | .......................... | 428/219 |

FOREIGN PATENT DOCUMENTS

| | | |
|---|---|---|
| CN | 1095744 | 11/1994 |
| DE | 541439 | 1/1932 |
| DE | 31 15 758 A1 | 11/1982 |
| DE | 34 20 462 A1 | 12/1985 |
| DE | 198 04 325 A1 | 8/1999 |
| DE | 198 44 722 A1 | 3/2000 |
| DE | 200 23 609 U1 | 2/2005 |
| DE | 102004002560 | 8/2005 |
| DE | 60 2004 010 235 T2 | 10/2008 |
| DE | 601 31 748 T2 | 10/2008 |
| EP | 0282240 | 9/1988 |

(Continued)

OTHER PUBLICATIONS

International Search Report for International App. No. PCT/EP2006/010459; 3 pages.

*Primary Examiner* — Eileen D Lillis
*Assistant Examiner* — Elizabeth A Plummer
(74) *Attorney, Agent, or Firm* — Kusner & Jaffe

(57) ABSTRACT

The invention relates to a construction panel, in particular for use in dry construction.

4 Claims, 1 Drawing Sheet

FOREIGN PATENT DOCUMENTS

Figure 1:
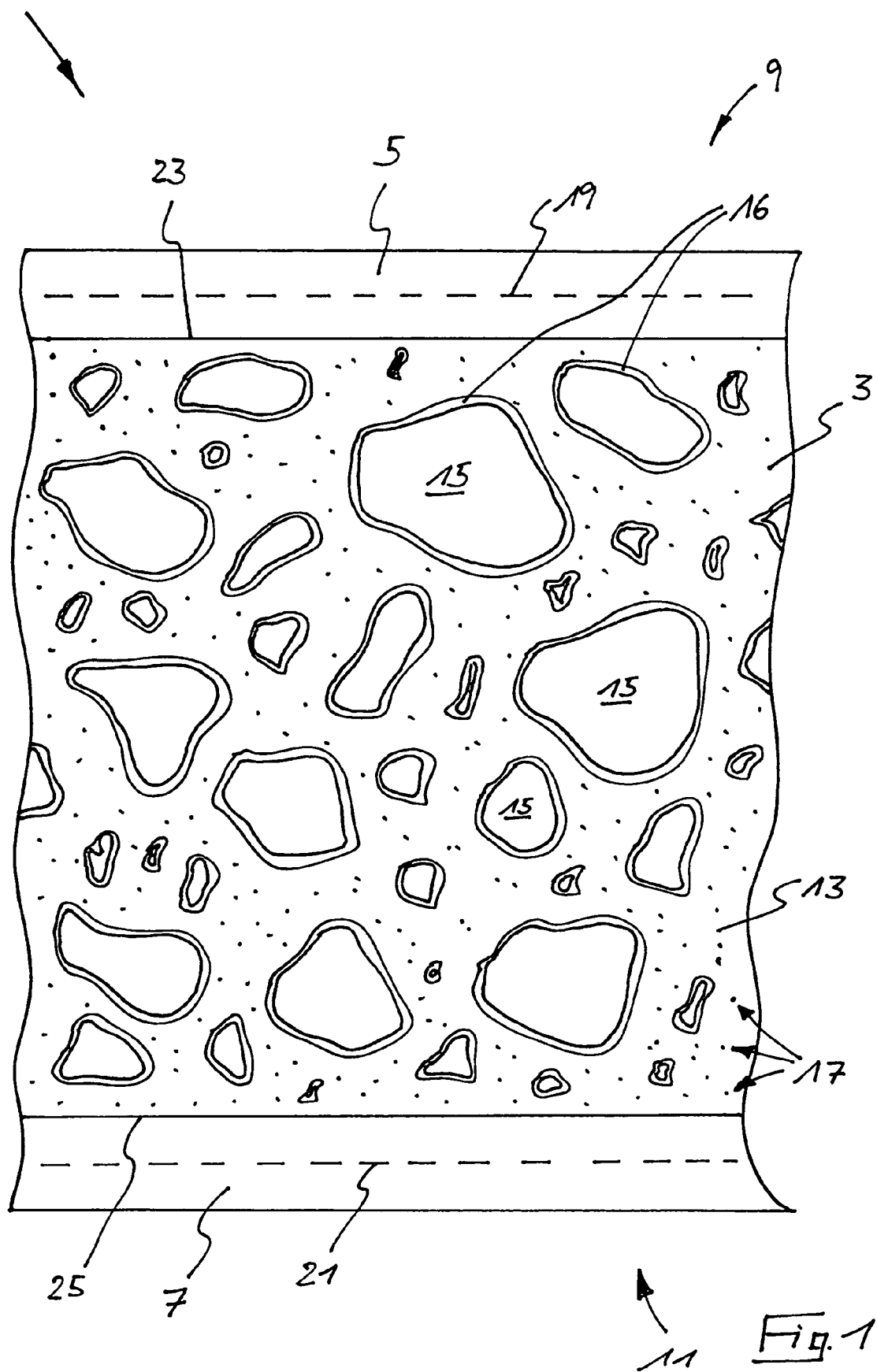

| | | |
|---|---|---|
| EP | 282240 A1 * | 9/1988 |
| EP | 0681998 | 11/1995 |
| EP | 0829459 | 3/1998 |
| EP | 0990628 | 4/2000 |
| EP | 1367189 | 12/2003 |
| FR | 1524312 | 5/1968 |
| RU | SU 885239 | 11/1981 |
| WO | WO 03/022776 | 3/2003 |

* cited by examiner

CONSTRUCTION BOARD

The invention relates to a construction board, in particular for use in dry construction.

In particular, such construction boards are also known in the form of so-called cement construction boards. Cement construction boards are made using a binding agent based on cement.

In order to improve the insulating properties and reduce the weight of such construction boards, it is known to add porous bulk material, in particular in the form of expanded clay, expanded shale, expanded glass, or pumice, to the binding agent mixture.

A disadvantage is, for one thing, the relatively high density of these components that is typically in the range from 350 to 700 kg/m$^3$. Because of this, the reducibility of the density or the weight of the construction board is limited. Also, the insulating properties of construction boards made using the above-mentioned, porous bulk materials need to be improved.

A disadvantage of the use of the above-mentioned bulk materials is, however, in particular also the fact that their availability is limited internationally, for which reason, in most cases, they first have to be transported with high logistic expenditure to the place of construction board production.

Ah excellent alternative to the above-mentioned, porous bulk materials would, be expanded perlite since this material has an extremely low density (dry bulk density (bulk weight) of only about 70 kg/m$^3$) and the insulating properties of a construction board made using expanded perlite therefore could be strongly improved. However, it is in particular an advantage of perlite that it exhibits an expansion factor of about 10 to 15, which means that when expanding from raw perlite to expanded perlite, it expands by the above-mentioned factor. Due to the small space required by it, raw perlite may therefore be transported to the place of utilization with little logistics costs and only there be expanded.

In practice, therefore there hasn't been a lack of trials to use expanded perlite for application in construction boards. Until now, such an application of perlite has failed in particular because of the high absorptive capacity of expanded perlite that resulted in the expanded perlite absorbing water or other moist ingredients of the moist binding agent mixture. The residual moisture of these construction boards was often considerably above 50%. This caused significant problems in particular during drying (sufficient drying was often not achievable at all; apart from that, drying to the desired residual moisture in reasonable time periods was only achievable using drying equipment which was associated with considerably expenses).

The invention is based on the object to provide a construction board that is made using expanded perlite, where the above-mentioned problems are not encountered.

This object is solved by a construction board exhibiting the following features:
- a matrix of a set, inorganic binding agent;
- grains of expanded perlite are embedded into the binding agent matrix;
- a hydrophobing agent is applied to the grains of expanded perlite.

According to a preferred advancement of this construction board, said board further exhibits the following features:
- an inert filler material is embedded into the binding agent matrix;
- the inert filler material has a dry bulk density that is higher than the dry bulk density of the hydrophobed expanded perlite.

A central idea of the invention is to apply a hydrophobing agent directly onto the expanded perlite. Ingress of water, in particular mixing water of the binding agent mixture, or other liquid into the grains of expanded perlite is thereby effectively prevented.

From prior art, the mass hydrophobing of binding agent mixtures is known, for example from EP 0 829 459 B1, in order to hereby reduce ingress of moisture from the binding agent mixture into absorbent components of the binding agent mixture. However, by means of mass hydrophobing, ingress of moisture, in particular mixing water of the binding agent mixture, into expanded perlite cannot be prevented to a sufficient extent.

The residual moisture of the construction board according to the application, without further drying of the board, may be for example between 10 and 20% by mass, based on the total weight of the construction board.

From trials with construction boards made using expanded perlite, the problem is known that the dry bulk density of the construction board is in part reduced by the expanded perlite to such an extent that the construction board is "too light-weights" for numerous practical applications.

Such a too light-weight construction board does no longer exhibit the required physical strengths. Also, these too light-weight construction boards are susceptible to wind tear-off on building exteriors.

Furthermore, with corresponding construction boards it was found that during the setting of the binding agent, significant shrinkage and shrinkage cracks in the construction board resulting therefrom partially occurred.

In order to solve the above-mentioned problems, a further central idea of the invention is to provide, besides the component of expanded perlite grains, a component in the form of an inert filler material in the binding agent mixture.

For one thing, by means of this inert filler material that has a dry bulk density that is higher than the dry bulk density of the hydrophobed expanded perlite, the average density or the weight (per unit area) of the construction board may be individually adjusted or increased. For example, if a relatively high portion of expanded perlite is used (whereby the density of the construction board is significantly reduced and its insulating properties are improved), at the same time, a relatively higher portion of inert filler material may be used, whereby the density of the construction board may be raised to, a desired value. Correspondingly, depending upon the desired density or the desired weight (per unit area) of the construction board, and depending upon the desired insulating properties of the construction board and the respective portion of expanded perlite in the construction board resulting therefrom, the amount of inert filler material in the construction board may be varied and adjusted.

For another thing, however, by means of the filler material, excessive shrinkage during setting of the binding agent in particular may also be prevented. This may in particular be attributed to the fact that the filler material does not undergo shrinkage due to its inert properties. According to the invention, it was found that the inert filler material is particularly resistant to shrinkage if the portion of pores of less than 0.1 μm in the inert filler material is less than 3% (based on the total pore volume of the inert filler material).

According to the invention, it was further found that the strength of a construction board according to the application may be enhanced by increased addition of inert filler material. This may evidently be attributed to the greatly improved shrinkage properties of the binding agent mixture when using inert filler material. Hence, if the strength of the construction board decreases with an increased portion of expanded perlite, more inert filler material may be added in order to enhance the strength again.

The construction board according to the application may in principle be made on the basis of any inorganic binding agent. Preferably, a binding agent in the form of cement, in particular Portland cement, for example CEM I 32.5 R, CEM I 42.5 R, or CEM I 52.5 R, may be used.

The set binding agent forms a matrix, into which one or additional components of the binding agent mixture, from which the construction board according to the application is made, are embedded.

One of the additional components is the grains of expanded perlite. These grains of expanded perlite may for example have a grain size in the range from greater than 0 mm to 6 mm. Particularly preferably, the expanded perlite is present in a grain, size in the range from 0.1 mm to 3 mm. The grains of expanded perlite may also be present for example in a grain size in the range from 0.1 mm to 6 mm, from 0.5 mm to 6 mm, from 1 mm to 6 mm, from 0.5 mm to 3 mm, or from 1 mm to 3 mm.

Preferably, the largest grains of expanded perlite have a grain size that is less than one third of the construction board thickness.

The dry bulk density (bulk weight) of the expanded perlite (without applied hydrophobing agent) used for the pre-hydrophobing according to the invention may be for example in the range from 40 to 100 kg/m$^3$, hence for example at 60 to 80 kg/m$^3$. The dry bulk density of the hydrophobed perlite may be for example in the range from 50 to 150 kg/m$^3$, hence for example also in the range from 70 to 100 kg/m$^3$.

According to the invention, a hydrophobing agent is applied to the grains of expanded perlite. For example, a hydrophobing agent in the form of wax, silicone, preferably for example in the form of silicone oil, or in the form of sodium oleate may be applied to the grains of expanded perlite. The hydrophobing agent may preferably be applied in liquid form, for example in the form of an aqueous emulsion, for example in the form of a liquid sodium oleate or in the form of an aqueous emulsion of a polydimethylsiloxane.

The correspondingly already pre-hydrophobed grains of expanded perlite are subsequently introduced into the binding agent mixture.

Grains of perlite pre-hydrophobed according to the invention may in particular be characterized in that they are present in the binding agent matrix with a hydrophobed "outer skin", no ingredients of the binding agent mixture, in particular no liquid ingredients, having entered the inferior of the grains at the same time.

Instead of grains of expanded perlite, grains of expanded vermiculite or foamed glass may be used cumulatively or alternatively in an equivalent manner. The explanations given herewith regard to expanded perlite apply correspondingly to grains of expanded vermiculite and foamed glass.

In addition to this, it may be intended that the binding agent mixture is also mass-hydrophobed. The binding agent mixture may thereby be hydrophobed for example by wax, silicone, or by a sodium oleate. By means of mass hydrophobing of the binding agent mixture, the set binding agent mixture and therewith the construction board is effectively protected against ingress of moisture.

As an additional component, the binding agent mixture, from which the construction board according to the application is made, contains inert filler material. In principle, any inert filler material, the dry bulk density of which is higher than the dry bulk density of the hydrophobed expanded perlite, may be used. Preferably, an inert filler material in the form of powdered stone, particularly preferably in the form of powdered limestone, may be used. In general, one or more of the following inert filler materials, that are preferably used in the form of powder or in fine-grained form, may be used: powdered limestone, sand, graywacke, basalt, dolomite, volcanic rock, slate (clay slate), or recycled material from the production of the construction board according to the application.

According to the invention, an "inert" filler material is intended to not adversely affect the setting characteristics of the binding agent or the binding agent mixture or even to improve them. Thus, the inert filler material as described above improves the shrinkage properties of the binding agent mixture.

What is meant by an "inert" filler material is sufficiently known to those skilled in the art of binding agents, so that a further definition may be forgone here. In particular, as is known, it is hereby expressed that a filler material does not have any hydraulic or latently hydraulic properties, or that the filler material does not show any significant chemical reactions in the binding agent mixture.

The dry bulk density (bulk weight) of the inert filler material may for example be in the range from 150 to 1500 kg/m$^3$, hence for example also in the range from 300 to 1000 kg/m$^3$ or from 350 to 800 kg/m$^3$.

Besides binding agent, hydrophobed expanded perlite, and optionally inert filler material, the binding agent mixture or the construction board according to the application made therefrom may also contain one or more additional components. The binding agent mixture may for example contain additional portions of a puzzolanic or latently hydraulic material, such as for example fly ash.

According to a preferred embodiment, the construction board has covering layers on at least one, preferably on both main surfaces (that is the two large surfaces of the construction board). Such a covering layer may consist for example of a set inorganic binding agent, preferably a binding agent slip. Preferably, a reinforcement, in particular in the form of a fiber mat, may be embedded in this binding agent.

These covering layers cover outwards the "core" of the construction board that is designed as described above. The binding agent of the covering layers preferably consists of the same binding agent as the "core" of the construction board, hence preferably of a Portland cement.

The fiber mat is preferably made from glass fibers that are protected from alkali etching (coatings) or alkali-resistant glass fibers. The fiber mat may in particular also only be provided in border or edge regions of the construction board in order to strengthen the edges.

By means of the covering layers, the exteriors of the construction board in particular may be advantageously designed. For example, the construction board may be provided with an optically pleasing, smooth surface by means of a covering layer made from a binding agent slip.

The binding agent of the covering layers may be mass-hydrophobed, for example by wax, silicone, or by a sodium oleate. By means of mass-hydrophobing of the covering layers, the construction board is particularly effectively protected against ingress of moisture.

The components of the construction board according to the application may be for example in the range of the following percentages by mass (based on the total mass of the construction board):

binding agent in the range from 10 to 40% by mass, hence for example also in the range from 15 to 35% by mass or in the range from 20 to 30% by mass;

hydrophobed expanded perlite in the range from 3 to 30%:
by mass, hence for example also in the range from 5 to 20 or in the range from 5 to 15% by mass;

optionally water (residual moisture) in the range from 0 to 20% by mass, hence for example also in the range from 5 to 20% by mass or in the range from 10 to 15% by mass;

optionally additional components in the range from 0 to 70% by mass, hence for example also in the range from 20 to 60% by mass or in the range from 30 to 60% by mass.

In case of a construction board according to the application made using in addition inert filler material, the components may be for example in the range of the following percentages by mass (based on the total mass of the construction board):

binding agent in the range from 10 to 40% by mass, hence for example also in the range from 15 to 35% by mass or in the range from 20 to 30% by mass;

hydrophobed expanded perlite in the range from 3 to 30% by mass, hence for example also in the range from 5 to 20 or in the range from 5 to 15% by mass;

inert filler material in the range from 10 to 70% by mass, hence for example also in the range from 20 to 60% by mass, in the range from 3.0 to 60% by mass, or in the range from 40 to 60% by mass;

optionally water (residual moisture) in the range from 0 to 20% by mass, hence for example also in the range from 5 to 20% by mass or in the range from 10 to 15% by mass;

optionally additional components in the range from 0 to 20% by mass, hence for example also in the range from 2 to 15% by mass.

While generic construction boards have been producible in a density range from about 1,000 to 1,200 kg/m$^3$ until now, the construction board according to the application may be manufactured for example in a density range from 300 to 1,200 kg/m$^3$. The construction board preferably has a density in the range from 350 to 1,000 kg/m$^3$, hence for example also in the range from 400 to 900 kg/m$^3$ or from 500 to 800 kg/m$^3$.

The preceding and other density and weight specifications in this application are specifications based on the dry bulk density of the product.

With construction boards, the weight per unit area also often plays an important role. With a thickness of a construction board according to the application in the range from 10 to 15 mm, hence for example with a thickness of 12.5 mm, for example construction boards according to the application having a weight, per unit area in the range from 4 to 15 kg/m$^2$ may be manufactured, hence for example also in a range from 5 to 13 kg/m$^2$, from 5 to 12 kg/m$^2$, or from 6 to 10 kg/m$^2$.

An exemplary composition of a construction board according to the application is as follows:
Portland cement: 24.1% by mass
expanded hydrophobed perlite (hydrophobing agent in the form of silicone oil; grain size of perlite 0.1-3 mm): 9.8% by mass
powdered limestone: 49.5% by mass
residual moisture: 16.6% by mass.

An exemplary composition of a covering layer to be applied to the construction board according to the application is for example as follows:
Portland cement: 20.0% by mass
powdered limestone: 60.0% by mass
glass fiber mat: 7.7% by mass
residual moisture: 12.3% by mass.

An exemplary composition of a construction board according to the application that is provided with a covering layer on each of its two main surfaces is for example as follows:
Portland cement: 23.3% by mass;
expanded hydrophobed perlite (hydrophobing agent in the form of silicone oil; grain size of perlite 0.1-3 mm): 10.0% by mass
powdered limestone: 52.4% by mass
glass fiber mat: 1.3% by mass
residual moisture: 13% by mass.

The construction board according to the invention may for example have a thickness in the range from 10 to 15 mm, for example a thickness of 12.5 mm.

The covering layers may for example each have a thickness in the range from 0.5 to 3 mm, hence for example also a thickness of 1 mm. Hence, a board having a thickness of 12.5 mm may for example have a "core" with a thickness of 10.5 mm, the "core" having a covering layer with a thickness of 1 mm on each of its two main surfaces.

The construction board according to the invention is particularly suitable for use in dry construction, for example as wall or floor board, in particular for example also as plaster base board.

All of the aforementioned features, of the construction board according to the application may be arbitrarily combined with each other, either individually or in combination.

An embodiment of a construction board according to the application is explained in more detail by means of the FIGURE description below.

It is shown, highly schematized, in

FIG. 1 a cut-out from a cross-section through a construction board according to the application in a sideways sectional view.

In FIG. 1, a cut through a construction board 1 is depicted that is constructed with a core 3, onto the one main surface 9 (here the upper one) and second main surface 11 (here the bottom one) of which is applied a covering layer 5 (top) and a covering layer 7 (bottom).

The core 3 of the construction board 1 is made from a binding agent mixture consisting of Portland cement, expanded perlite hydrophobed with silicone oil, and powdered limestone. Furthermore, the core 3 of the construction board 1 is mass-hydrophobed by means of sodium oleate.

In core 3 of construction board 1, the set Portland cement forms a matrix 13, into which the grains of hydrophobed expanded perlite 15 and the powdered limestone 17 as inert filler material are embedded.

The core 3 of construction board 1 has a thickness of 10.5 mm.

As depicted in FIG. 1, the grains of hydrophobed expanded perlite 15 each have an outer skin 16 of hydrophobing agent that prevents ingress of liquid into the grains of perlite 15.

Along its two main surfaces 9 and 11, the construction board 1 has a covering layer each 5, 7 that outwards completely cover the core 3.

The covering layers 5, 7 are each 1 mm in thickness and are made from Portland cement wherein a glass fiber mat each 19, 21 is embedded. The covering layers 5, 7 are mass-hydrophobed by a silicone oil emulsion.

In the embodiment, the "boundaries" 23, 25 between the covering layers 5, 7 and the core 3 are shown as a sharp parting line for clearness reasons. However, in the practical implementation, the covering layers may also "smoothly" transition into the core, so that a sharp parting line is not always recognizable.

The invention claimed is:

1. A construction board, for use in dry construction, the construction board comprising:

a binding agent matrix (13) of a set, inorganic binding agent in the form of Portland cement wherein the binding matrix (13) is in the range from 10 to 40% by mass;

grains of open-surfaced, expanded perlite (15) embedded into the binding agent matrix (13), wherein the grains of open-surfaced, expanded perlite (15) have a grain size in the range from 1 mm to 6 mm and the open-surfaced, expanded perlite (15) is in the range from 3 to 30% by mass;

a hydrophobing agent (16) disposed on the grains of open-surfaced, expanded perlite (15);

an inert filler material (17) embedded into the binding agent matrix (13), wherein the inert filler material (17) is powdered stone having a dry bulk density that is higher than a dry bulk density of the open-surfaced, expanded perlite (15) and the inert filler material (17) is in the range from 10 to 70% by mass;

covering layers (5, 7) on both main surfaces (9, 11) of the construction board, the covering layers (5, 7) including a set binding agent with an embedded fiber mat (19, 21);

water or residual moisture in the range from 0 to 20% by mass; and additional components in the range from 0 to 20% by mass.

2. A construction board according to claim 1, wherein the hydrophobing agent (16) is silicone.

3. A construction board according to claim 1, wherein the powdered stone is powdered limestone.

4. A construction board according to claim 1, wherein the dry bulk density of the open-surfaced, expanded perlite (15) is in the range from 50 to 150 kg/m$^3$ and the dry bulk density of inert filler material (17) is in the range from 150 to 1500 kg/m$^3$.

* * * * *